(12) United States Patent
Shigeta

(10) Patent No.: US 6,744,483 B2
(45) Date of Patent: Jun. 1, 2004

(54) LIQUID CRYSTAL DISPLAY AND PROJECTOR HAVING ELECTRODE SECTION WITH EQUAL AREAS AND DIFFERENT HEIGHTS

(75) Inventor: Masanobu Shigeta, Yokosuka (JP)

(73) Assignee: Victor Company of Japan, Ltd. (JP)

( * ) Notice: Subject to any disclaimer, the term of this patent is extended or adjusted under 35 U.S.C. 154(b) by 362 days.

(21) Appl. No.: 09/839,560

(22) Filed: Apr. 20, 2001

(65) Prior Publication Data

US 2001/0038434 A1 Nov. 8, 2001

(30) Foreign Application Priority Data

Apr. 27, 2000 (JP) .......................... 2000-127573

(51) Int. Cl.$^7$ ............................................ G02F 1/1343
(52) U.S. Cl. ...................... 349/143; 349/144; 349/147; 349/107; 349/113
(58) Field of Search ................................ 349/107, 113, 349/114, 141, 143, 144, 147, 160

(56) References Cited

U.S. PATENT DOCUMENTS 5,257,122 A * 10/1993 Dubal et al. ................. 349/85
5,570,213 A 10/1996 Ruiz et al. .................... 359/72
5,897,187 A * 4/1999 Aoki et al. ................... 349/144
6,195,140 B1 * 2/2001 Kubo et al. ................... 349/44

FOREIGN PATENT DOCUMENTS

| JP | 11-174427 | 7/1999 | ......... G02F/1/1333 |
| JP | 11-337935 | 12/1999 | ......... G02F/1/1335 |

* cited by examiner

Primary Examiner—Robert H. Kim
Assistant Examiner—Andrew Schechter
(74) Attorney, Agent, or Firm—Renner, Kenner, Greive, Bobak, Taylor & Weber

(57) ABSTRACT

A liquid crystal display has a liquid crystal layer, a first electrode substrate; and a second electrode substrate provided as facing the first substrate so that the liquid crystal layer is sandwiched by the first and the second substrates. At least either the first or the second substrate is a transparent substrate. At least either the first or the second substrate is provided with first electrode sections each having a first height and a plurality of second electrode sections each having a second height. The first height is higher than the second height by a predetermined height. Areas of the first electrode sections in total and that of the second electrode sections in total is equal to each other on at least either the first or the second substrate.

11 Claims, 4 Drawing Sheets

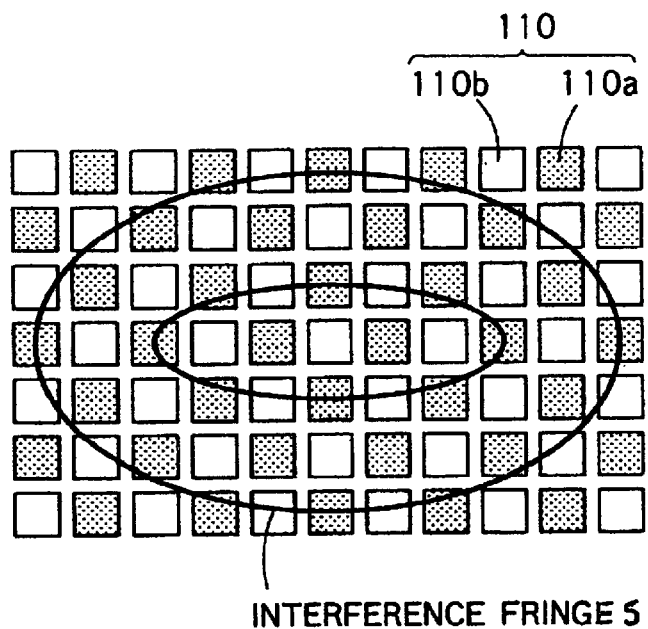
INTERFERENCE FRINGE S
F I G. 4
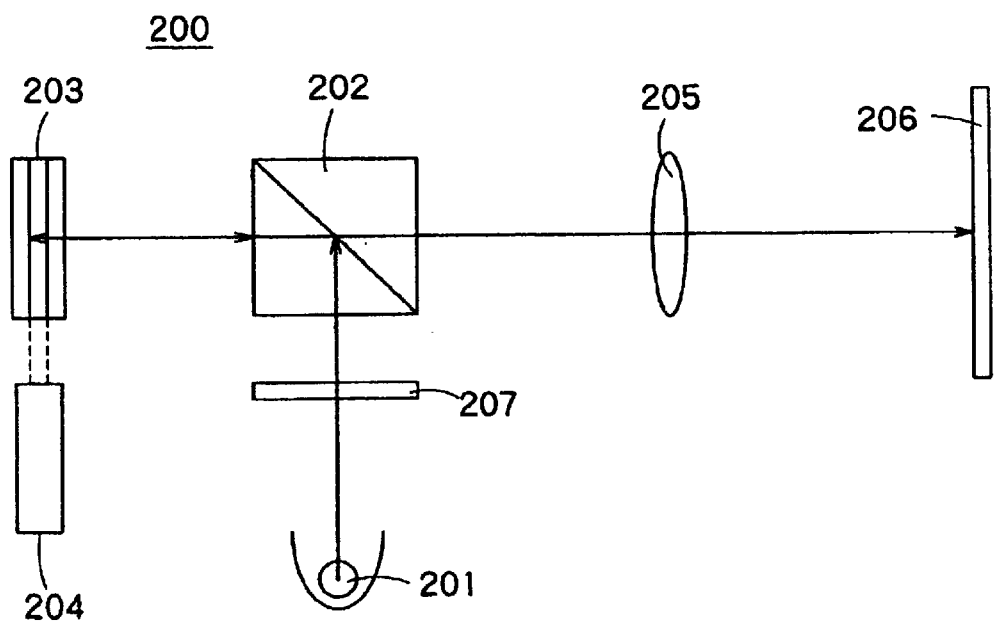
F I G. 5

LIQUID CRYSTAL DISPLAY AND PROJECTOR HAVING ELECTRODE SECTION WITH EQUAL AREAS AND DIFFERENT HEIGHTS

BACKGROUND OF THE INVENTION

The present invention relates to a liquid crystal display and a projector using the same. Particularly, this invention relates to improvement in liquid crystal display for restricting generation of interference fringes due to reflection of light caused at the interface between a transparent layer and a liquid crystal layer of the liquid crystal display.

Liquid crystal projectors have recently been used, for example, for presentation of new products using images created by computer-graphics and projected onto a screen and in home theater in which moving pictures are projected onto a large screen.

Moreover, reflective liquid crystal displays used for such projectors have been the focus of much attention for high intensity and resolution because they have a large aperture even at high pixel density.

Problems on conventional reflective liquid crystal displays are discussed with reference to FIG. 1.

A reflective liquid crystal display shown in FIG. 1 is provided with a liquid crystal layer 4 sandwiched by a transparent electrode 2 and a substrate 3 of integrated circuitry (called an IC-substrate hereinafter).

The transparent electrode 2 consists of a transparent glass substrate 5 and also a transparent electrode layer 6 and a first orientation film 7 stacked under the substrate 5.

The IC-substrate 3 consists of a silicon substrate 8 and also an active-matrix driver 9, pixel electrodes 10 and a second orientation film 11 stacked on the silicon substrate 8.

The transparent electrode 2 and the IC-substrate 3 are bonded with each other so that the first and the second orientation films 7 and 11 face each other.

In operation, a linearly-polarized reading light beam is incident from the transparent electrode 2 side to reach the pixel electrodes 10 of the IC-substrate 3 through the liquid crystal layer 4.

A light beam reflected at the pixel electrodes 10 passes through the liquid crystal layer 4 in the direction reversal of incidence and is emitted from the transparent electrode 2. The emitted light beam is projected onto a screen via a projection lens (both not shown) to display an image thereon which has been optically modulated in accordance with a video signal in the liquid crystal layer 4.

The transparent electrode layer 6 is made of a transparent conductive film, such as, ITO (Indium Tin Oxide) of high reflectivity. Thus, there is a big difference in reflectivity at the interface between the transparent electrode layer 6 and the liquid crystal layer 4.

This causes reflection, at the interface, of some beam components of the light beam which has been reflected at the pixel electrode layer 10. The beam components reflected at the interface and the input reading light beam could generate interference fringes, thus lowering quality of images projected onto the screen when the thickness of the liquid crystal layer 4 is not constant (variation in cell gap).

Liquid crystal projectors using this conventional reflective liquid crystal display is provided with a light source, such as, a metal halide lamp or a ultra-high pressure mercury lamp of high emission efficiency containing mercury as an emission triggering gas. These lamps generate strong emission lines of 440, 540 and 580 nm in an emission spectrum in visible radiation range.

Restriction of interference fringes caused by specific emission lines of light source requires control of variation in cell gap in accuracy of λ/4 (λ: wavelength of emission lines of light source that causes interference fringes) or lower for high consistency.

Control of variation in cell gap in such accuracy is possible in principle but not practical for mass-production.

U.S. Pat. No. 5,570,213 discloses a multi-layer anti-reflection film having a transparent electrode layer for restricting reflection at the interface, thus controlling generation of interference fringes.

The multi-layer anti-reflection film, however, requires thickness of reflectivity at 0.1% or lower, thus causing increase in production cost.

Moreover, the multi-layer anti-reflection film is made of a multi-layer non-conductive optical thin film. Coating the transparent electrode with the optical thin film causes charge storage on the film when applied electric field carries a d. c. current, which could cause image sticking on the liquid crystal layer.

Japanese Un-examined Patent Publication No. 11-337935 discloses scattered reflection-type electrode having irregularity on pixel electrodes for controlling generation of interference fringes.

Scattered radiation is, however, generated due to reflection on the pixel electrodes, which lowers contrast and intensity, thus causing degradation of displayed images.

SUMMARY OF THE INVENTION

A purpose of the present invention is to provide a liquid crystal display of high image quality and suitable to mass-production with restricted interference fringes even employing a light source of high emission efficiency to generate strong emission lines, and also a projector equipped with the liquid crystal display.

The present invention provides a liquid crystal display including: a liquid crystal layer; a first electrode substrate; and a second electrode substrate, provided as facing the first substrate so that the liquid crystal layer is sandwiched by the first and the second substrates, at least either the first or the second substrate being a transparent substrate, at least either the first or the second substrate being provided with first electrode sections each having a first height and a plurality of second electrode sections each having a second height, the first height being higher than the second height by a predetermined height, areas of the first electrode sections in total and areas of the second electrode sections in total being equal to each other on at least either the first or the second substrate.

Moreover, the present invention provides a projector including: a light source to emit a reading light beam; a filter to allow a specific light beam component only of the reading light beam to pass therethrough; a polarization beam splitter to split the light beam component in polarization; a liquid crystal display to optically modulate the light beam component, thus emitting a reflected light beam; and a projection lens to project the reflected light beam onto a screen via the polarization beam splitter, wherein the liquid crystal display has a liquid crystal layer, a first electrode substrate and a second electrode substrate provided as facing the first substrate so that the liquid crystal layer is sandwiched by the first and the second substrates, at least either the first or the second substrate being a transparent substrate, at least either the first or the second substrate being provided with first electrode sections each having a first height and a plurality of second electrode sections each having a second height, the first height being higher than the second height by a predetermined height, areas of the first electrode sections in total and areas of the second electrode sections in total being equal to each other on at least either the first or the second substrate.

BRIEF DESCRIPTION OF DRAWINGS

FIG. 4 is a plan view illustrating arrangement of pixel electrodes formed on a pixel electrode layer in the embodiment shown in FIG. 3;

FIG. 5 is a schematic illustration of a preferred embodiment of a liquid crystal projector equipped with the reflective liquid crystal display shown in FIG. 3 according to the present invention;

DETAILED DESCRIPTION OF PREFERRED EMBODIMENTS

Discussed before embodiments is a principle of generation of interference fringes due to reflection at the interface between a transparent electrode and a liquid crystal layer of a liquid crystal display.

Figure 1:
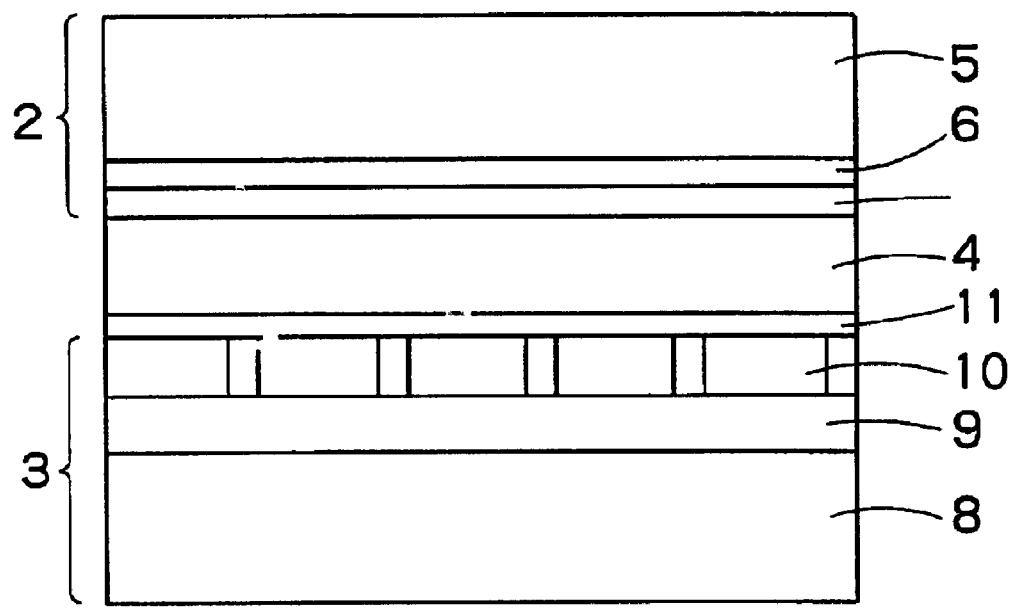
FIG. 1 is a cross sectional view schematically illustrating structure of a conventional reflective liquid crystal display.
Figure 2:
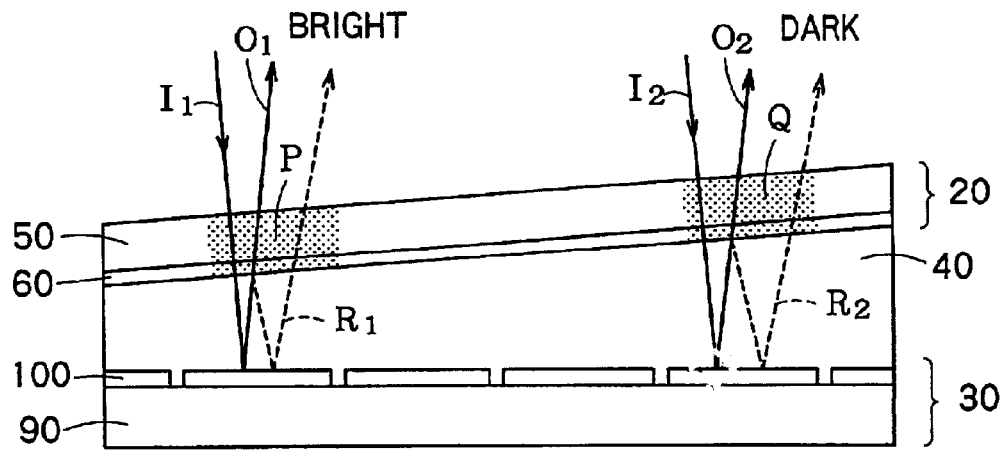
FIG. 2 is a cross sectional view schematically illustrating structure of a sample reflective liquid crystal display depicting generation of interference fringes caused by interface-reflected light beams generated between a transparent electrode layer and a liquid crystal layer.

Illustrated in FIG. 2 is a sample reflective liquid crystal display provided with a liquid crystal layer 40 sandwiched by a transparent electrode substrate 20 and a substrate 30 of integrated circuitry (called an IC-substrate hereinafter).

The transparent electrode substrate 20 includes a transparent glass substrate 50 and also a transparent electrode layer 60 provided under the substrate 50. The IC-substrate 30 includes an active-matrix driver 90 and a pixel electrode layer 100. The transparent electrode substrate 20 and the IC-substrate 30 further include orientation films which are omitted here for brevity. The IC-substrate 30 further has a silicon base substrate which is also omitted here for brevity.

The sample device is produced so that the transparent electrode substrate 20 is inclined as shown, thus causing variation in cell gap.

The transparent electrode layer 60 is not a type such as the one disclosed in U.S. Pat. No. 5,570,213 but a regular one.

It is assumed that light beams $I_1$ and $I_2$ are incident to areas P and Q, respectively, of the transparent electrode substrate 20, thus causing interference fringes.

The light beams $I_1$ that has been incident to the area P is reflected at the pixel electrode layer 100 while passing through the liquid crystal layer 40 and emitted from the transparent electrode substrate 20 as a light beam $O_1$.

Some beam components of the light beam $O_1$ are reflected at the interface between the transparent electrode layer 60 and the liquid crystal layer 40 to generate interface-reflected light beam $R_1$ (indicated by a dashed line).

The light beam $R_1$ passes through the liquid crystal layer 40 again and is reflected at the pixel electrode layer 100, thus being emitted from the area P of the transparent electrode substrate 20.

Likewise, the light beams $I_2$ that has been incident to the area Q is reflected at the pixel electrode layer 100 while passing through the liquid crystal layer 40 and emitted from the transparent electrode substrate 20 as a light beam $O_2$.

Some beam components of the light beam $O_2$ are reflected at the interface between the transparent electrode layer 60 and the liquid crystal layer 40 to generate interface-reflected light beam $R_2$ (indicated by a dashed line).

The light beam $R_2$ passes through the liquid crystal layer 40 again and is reflected at the pixel electrode layer 100, thus being emitted from the area Q of the transparent electrode substrate 20.

The light beams passing through the liquid crystal layer 40 have difference in light pass length due to inclination of the transparent electrode substrate 20 against the IC-substrate 30, as shown in FIG. 2.

Light pass lengths in the liquid crystal layer 40 for the emitted light beam $O_1$, the reflected light beam $R_1$, the emitted light beam $O_2$, and the reflected light beam $R_2$ are expressed as $2n \times d_1$, $4n \times d_1$, $2n \times d_2$, and $4n \times d_2$, respectively, where "n", "$d_1$" and "$d_2$" indicate reflectivity of the liquid crystal layer 40, a physical cell gap in the area P, and a physical cell gap in the area Q, respectively.

Phases between the emitted light beams and the interface-reflected light beams in the areas P and Q are expressed as below when $2n \times d_1 = m_1 \times \lambda$ and $2n \times d_2 = m_2 \times \lambda + \lambda/2$ where $m_1$ and $m_2$ indicate positive integers and $\lambda$ indicates a wavelength of specific emission lines of a light source.

(Area P)

emitted light beam $O_1$: $2n \times d_1 = m_1 \times \lambda$ reflected light beam $R_1$: $4n \times d_1 = 2m_1 \times \lambda$ (Area Q)

emitted light beam $O_2$: $2n \times d_2 = m_2 \times \lambda + \lambda/2$ reflected light beam $R_2$: $4n \times d_2 = (2m_2 + 1) \times \lambda$ $= (2m_2 \times \lambda) + \lambda$ These expressions suggest the following:

The emitted light beam $O_1$ and the reflected light beam $R_1$ are in phase in the area P so that these light beams interfere with each other, thus the area P becoming a bright area.

On the other hand, the emitted light beam $O_2$ and the reflected light beam $R_2$ are out of phase in the area Q so that these light beams interfere with each other, thus the area Q becoming a dark area.

As discussed above, the emitted and reflected light beams interfere with each other to generate interference fringes of bright and dark.

A preferred embodiment according to the present invention will be disclosed with reference to the attached drawings.

Elements in the embodiment that are the same as or analogous to elements in the sample device shown in FIG. 2 are referenced by the same reference numbers and will not be explained in detail.

Figure 3:
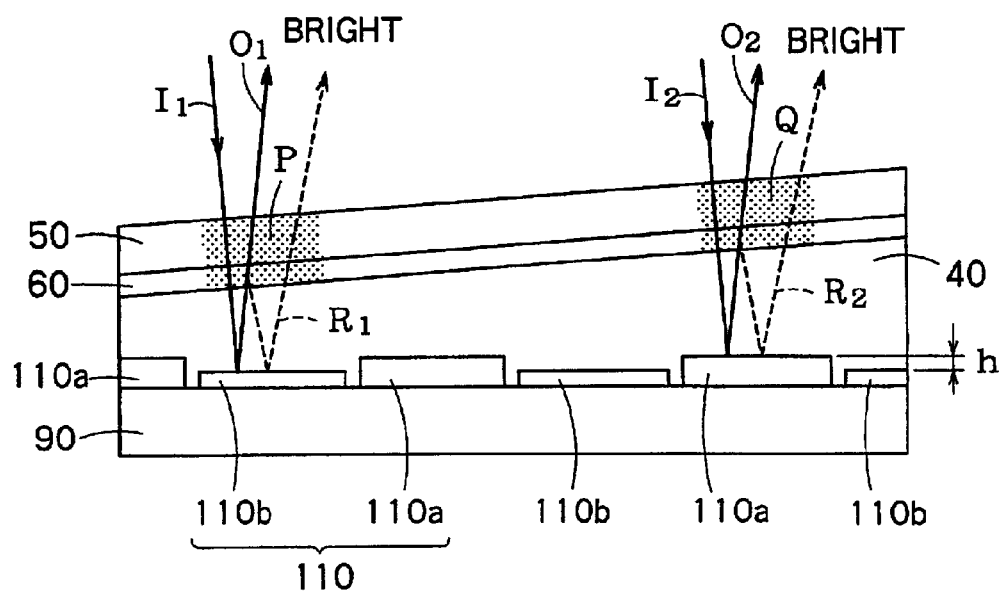
FIG. 3 is a cross sectional view schematically illustrating structure of a preferred embodiment of a reflective liquid crystal display according to the present invention.

As shown in FIG. 3, the preferred embodiment of a liquid crystal display according to the present invention is provided with a pixel electrode layer 110 having pixel electrodes 110a and 110b arranged in matrix as illustrated in FIG. 4. The pixel electrodes 110a are formed so that they are higher than the pixel electrodes 10b by a height "h". The pixel electrodes 110a and 110b correspond to the areas Q and P, respectively.

The principle of the present invention is explained with reference to FIG. 3 in accordance with the following requirements (1) and (2) for the light pass length of the light beams emitted from the areas P and Q when the height $h=(1/n) \times \lambda/4$:

(1) light pass length of the light beam $O_1$ emitted from the area P ... $2n \times d_1 = m_1 \times \lambda$, and light pass length of the light beam $O_2$ emitted from the areas Q ... $2n \times d_2 = m_2 \times \lambda + \lambda/2$ (2) light pass length of the light beam $O_1$ emitted from the area P ... $2n \times d_1 = m_1 \times \lambda + \lambda/2$, and light pass length of the light beam $O_2$ emitted from the areas Q ... $2n \times d_2 = m_2 \times \lambda$.

Discussed first is the principle of the present invention under the requirement (1).

As already explained, the light pass length of the interface-reflected light beam $R_1$ is expressed as $4n \times d_1 = 2m_1 \times \lambda$ when that of the light beam $O_1$ emitted from the area P is $2n \times d_1 = m_1 \times \lambda$. This results in that the emitted light beam $O_1$ and the reflected light beam $R_1$ are in phase in the area P, thus the light beams $O_1$ and $R_1$ interfering with each other so that the area P becomes a bright area.

The light pass lengths of the emitted light beam $O_2$ and the reflected light beam $R_2$ passing through the liquid crystal layer 40 in the area Q where the pixel electrode 110a has the height "h" with a physical cell gap $d_3$ are expressed as follows:

$$\text{emitted light beam } O_2 \ldots 2n \times d_3 = 2n \times (d_2 - h) \times \lambda = m_2 \times \lambda$$

and $$\text{reflected light beam } R_2 \ldots 4n \times d_3 = 4n \times (d_2 - h) \times \lambda = 2m_2 \times \lambda.$$

These expressions suggest that the emitted light beam $O_2$ and the reflected light beam $R_2$ are in phase in the area Q, thus the light beams $O_2$ and $R_2$ interfering with each other so that the area Q becomes a bright area.

As discussed, both areas P and Q become bright areas so that no interference fringes of bright and dark are generated.

Discussed next is the principle of the present invention under the requirement (2).

The light pass length of the interface-reflected light beam $R_1$ is expressed as $4n \times d_1 = (2m_1 + 1) \times \lambda$ when that of the light beam $O_1$ emitted from the area P is $2n \times d_1 = m_1 \times \lambda + \lambda/2$. These expressions suggest that the emitted light beam $O_1$ and the reflected light beam $R_1$ are out of phase in the area P, thus the light beams $O_1$ and $R_1$ interfering with each other so that the area P becomes a dark area.

The light pass lengths of the emitted light beam $O_2$ and the reflected light beam $R_2$ passing through the liquid crystal layer 40 in the area Q where the pixel electrode 110a has the height "h" with the physical cell gap $d_3$ are expressed as follows:

$$\text{emitted light beam } O_2 \ldots 2n \times d_3 = 2n \times (d_2 - h) = m_2 \times \lambda - \lambda/2$$

and $$\text{reflected light beam } R_2 \ldots 4n \times d_3 = 4n \times (d_2 - h) = (2m_2 - 1) \times \lambda.$$

These expressions suggest that the emitted light beam $O_2$ and the reflected light beam $R_2$ are out of phase in the area Q, thus the light beams $O_2$ and $R_2$ interfering with each other so that the area Q becomes a dark area.

As discussed, both areas P and Q become dark areas so that no interference fringes are generated.

The foregoing discussion was given under the requirement that the height "h" is $(1/n) \times \lambda/4$.

The principle of the present invention is explained further under the requirements that the height "h" is $(1/n) \times \lambda/8$ or $(1/n) \times 3\lambda/8$.

The difference in phase between the emitted light beam $O_2$ and the reflected light beam $R_2$ is $\lambda/4$ when the height "h" is $(1/n) \times \lambda/8$ and $3\lambda/4$ when it is $(1/n) \times 3\lambda/8$.

This results in that the difference in phase between the emitted light beam $O_2$ and the reflected light beam $R_2$ in the area Q is 90 degrees when the height "h" is $(1/n) \times \lambda/8$ and 270 degrees when it is $(1/n) \times 3\lambda/8$, thus interfering with each other to produce an intermediate intensity.

Interference fringes are generated as repetition of bright and intermediate intensity or dark and intermediate intensity, with small difference in intensity, thus the interference fringes pattern being almost unnoticeable.

The forgoing discussion suggests that the pixel electrodes 110a and 110b formed on the pixel electrode layer 110 with the height "h" for the pixel electrodes 110a higher than the pixel electrodes 110b by $(1/n) \times \lambda/8 \leq h \leq (1/n) \times 3\lambda/8$ serves to restrict generation of interference fringes due to interference between the emitted light beam $O_1$ (or $O_2$) and the reflected light beam $R_1$ (or $R_2$). Particularly, no generation of interference fringes will occur when the height "h" is $(1/n) \times \lambda/4$.

As already discussed, the metal halide lamp and the ultra-high pressure mercury lamp generate strong emission lines of 440, 540 and 580 nm in an emission spectrum in visible radiation range, which cause generation of interference fringes.

Our eyes exhibit spectral luminous efficacy characteristics with a peak in the range of green, hence interference fringes generated by 440 nm-emission lines in the range of blue will be almost unnoticeable, thus causing almost no problems. Moreover, 580 nm-emission lines are cut off by a bandwidth filter because they are usually unnecessary, thus causing almost no problems.

As discussed above, generation of interference fringes (illustrated in FIG. 4) will be restricted with the height "h"=$(1/n) \times (\lambda/8 \text{ to } 3\lambda/8)$ for the pixel electrode layer, where $\lambda$ is a wavelength of a specific emission lines from a light source and "n" is reflectivity of the liquid crystal layer.

This teaches that the height "h" for the pixel electrode layer 110 in the range of 40 nm $\leq h \leq$ 130 nm at reflectivity 1.52 for the liquid crystal layer 40 serves to restrict generation of interference fringes which may otherwise be caused by emission lines of 540 nm, the center wavelength in the range of green.

As disclosed above, the liquid crystal display according to the present invention is provided with the difference in height "h" between two adjacent pixel electrodes, which serves to restrict generation of interference fringes not over the entire displaying area of the liquid crystal display but some regions by canceling locally (FIG. 4) the requirements for generation of interference fringes discussed above, thus interference fringes being unnoticeable overall.

Disclosed next with reference to FIG. 5 is a preferred embodiment of a projector equipped with the liquid crystal display shown in FIG. 3, according to the present invention.

A liquid crystal projector 200 shown in FIG. 5 is provided with a metal halide lamp 201 for emitting a reading light beam, a selective transmission filter 207 for allowing a green light beam component of about 50 nm for half bandwidth only of the reading light beam to pass therethrough, a polarization beam splitter 202 for splitting the green light beam component in polarization, a liquid crystal display 203 (FIG. 3) for optically modulating the green light beam component thus split in polarization and then emitting a reflected light beam, and a projection lens 205 for projecting the reflected light beam onto a screen 206 via the polarization beam splitter 202. Connected to the liquid crystal display 203 is a drive circuit 204 for driving the display 203.

Experiments on this projector showed that the larger the difference in height "h" provided between adjacent pixel electrodes, the less the interference fringed being noticeable for higher image quality.

In detail, the difference in height "h"=40 to 130 nm for emission lines with λ=540 nm at n=1.52 made hard to notice interference fringes by actual observation. Particularly, interference fringes were completely unnoticeable at "h"=90 nm.

Figure 6:
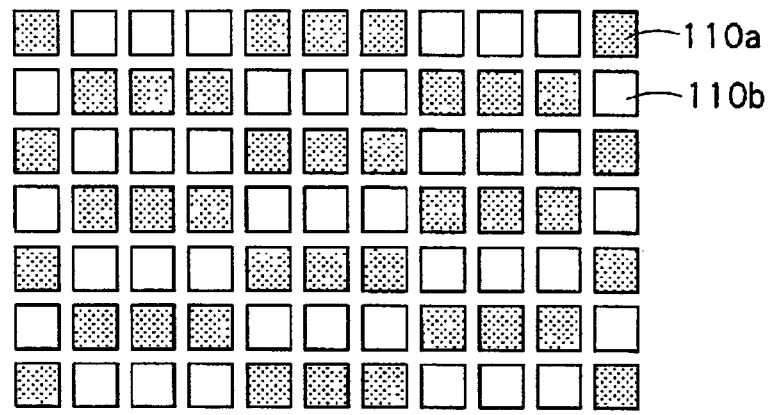
FIG. 6 is a plan view illustrating a modification to arrangement of pixel electrodes formed on a pixel electrode layer.

Illustrated in FIG. 6 is a modification to the pixel electrode layer 110 (FIG. 4) of the liquid crystal display according to the present invention.

In FIG. 4, the electrodes 110a and 110b are provided alternately so that the difference in height "h" is provided between two adjacent electrodes 110a and 110b.

On the other hand, in FIG. 6, a group of several pixel electrodes 110a and another group of the same number of pixel electrodes 110b are provided alternately so that the difference in height "h" is provided between two adjacent electrode groups. Pixel electrodes in each group have the same height. In FIG. 6, each electrode group has three electrodes at the same height.

This modification also attains the advantages the same as discussed above.

Figure 7:
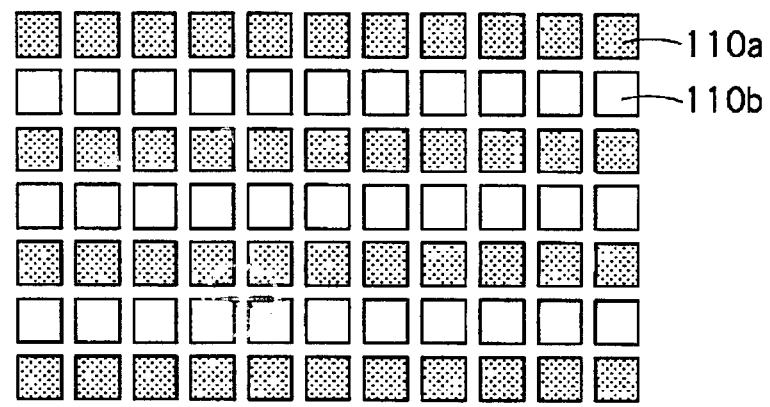
FIG. 7 is a plan view illustrating another modification to arrangement of pixel electrodes formed on a pixel electrode layer.

Illustrated in FIG. 7 is another modification to the pixel electrode layer 110 (FIG. 4) of the liquid crystal display according to the present invention.

In FIG. 7, a row of the pixel electrodes 110a and another row of the same number of the pixel electrodes 110b are provided alternately so that the difference in height "h" is provided between two adjacent rows of electrodes. Pixel electrodes in each row have the same height.

FIG. 7 shows a plurality of rows of pixel electrodes arranged in the horizontal direction. It is also preferable that, although not shown, such rows of pixel electrodes are arranged in the vertical direction.

This modification also attains the advantages the same as discussed above.

Figure 8:
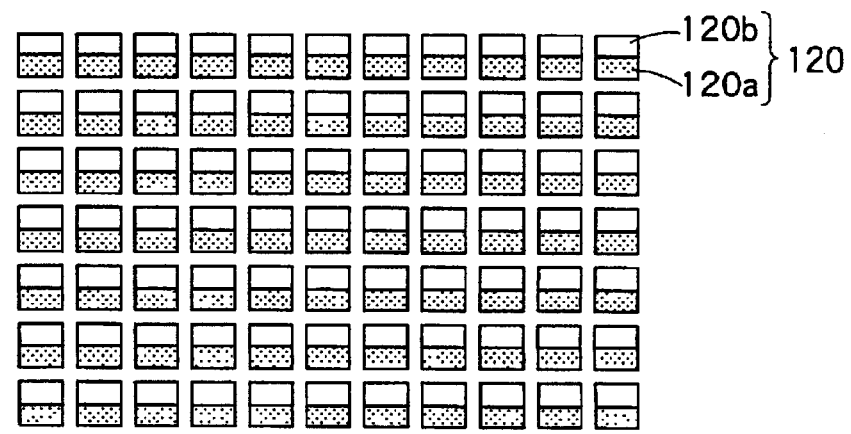
FIG. 8 is a plan view illustrating still another modification to arrangement of pixel electrodes formed on a pixel electrode layer.

Illustrated in FIG. 8 is still another modification to the pixel electrode layer 110 (FIG. 4) of the liquid crystal display according to the present invention.

In FIG. 8, a plurality of pixel electrodes 120 are arranged in matrix. Each pixel electrode 120 is provided with electrode regions 120a and 120b. All electrode regions 120a have the same height. Moreover, all electrode regions 120b have the same height. Each electrode region 120a is higher than each electrode region 120b by "h". It is also preferable that each electrode region 120b is higher than each electrode regions 120a by "h".

This modification also attains the advantages the same as discussed above.

The effects achieved by providing the difference in height "h" for the modifications disclosed above were also examined using the liquid crystal projector 200 shown in FIG. 5. Experiments for each modification showed the effects almost the same as explained with reference to FIG. 5.

As disclosed above, the liquid crystal display according to the present invention provided with the difference in height "h" for the modifications also restricts generation of interference fringes on some regions by locally canceling the requirements for generation of interference fringes as discussed above, thus interference fringes being unnoticeable overall for high image quality.

The pixel electrode layers according to the present invention in the embodiment and modifications are provided with a plurality of first electrode sections (110a or 120a) and second electrode sections (110b or 120b).

Each first electrode section is higher than each second electrode section by a predetermined height "h" as disclosed, which is one of the minimum requirements for attaining the advantages of the present invention.

The other minimum requirement is that the total area of the first electrode sections is equal to that of the second electrode sections for attaining the advantages of the present invention. It is, however, preferable that an area of each first electrode section is equal to that of each second electrode section.

An interface-reflected light beam generated in each pair of the first and the second electrode sections having the difference in height is not a scattered beam, so that it can be used as a projection light beam. The present invention therefore provides a liquid crystal display of high intensity and contrast.

The difference in height "h" may be provided on the transparent electrode layer or both the transparent electrode layer and the pixel electrode layer.

As disclosed above, the liquid crystal display according to the present invention is provided with the first and the second electrode sections having the difference in height as disclosed over at least either the transparent electrode layer or the pixel electrode layer, thus restricting generation of interference fringes on some regions by locally canceling the requirements for generation of interference fringes, which may otherwise occur due to variation in cell gap as discussed above, so that interference fringes are separated into small segments, thus being unnoticeable overall for high image quality.

Moreover, the liquid crystal display according to the present invention does not require a non-conductive multi-layer anti-reflection film which is used in a convention device, thus causing no image sticking on the liquid crystal layer.

Moreover, in the liquid crystal display according to the present invention, the difference in height provided over the transparent electrode layer and/or the pixel electrode layer do not cause scattered reflection. Therefore, interface-reflected light beams generated between the transparent electrode layer and the liquid crystal layer are not scattered beams, so that all of them can be used as projection light beam. The present invention therefore provides a liquid crystal display of high intensity and contrast.

Furthermore, the present invention is not limited to a reflective liquid crystal display, for example, it is applicable to a transmission liquid crystal display.

What is claimed is:

1. A liquid crystal display comprising:
   a liquid crystal layer;
   a first electrode substrate; and
   a second electrode substrate, provided as facing the first substrate so that the liquid crystal layer is sandwiched by the first and the second substrates, the first substrate being a transparent substrate, the second substrate being provided with first electrode sections each having first thickness and height and a plurality of separate second electrode sections each having second thickness and height, the first thickness being thicker than the second thickness by a predetermined thickness, the first height being higher than the second height by a predetermined height, areas of the first electrode sections in total and areas of the separate second electrode sections in total being equal to each other on the second substrate.

2. The liquid crystal display according to claim 1, wherein the first electrode substrate is the transparent substrate and the second electrode substrate is a reflective electrode substrate.

3. The liquid crystal display according to claim 1, wherein the predetermined height is determined in a range from $(1/n) \times \lambda/8$ to $(1/n) \times 3\lambda/8$ where "n" is the index of refraction of the liquid crystal layer and $\lambda$ is a wavelength of emission lines generated by a light source that emits a reading light beam to the liquid crystal layer via either the first or the second substrate that is the transparent substrate.

4. The liquid crystal display according to claim 1, wherein an area of each first electrode section and an area of each second electrode section are equal to each other on the second substrate.

5. The liquid crystal display according to claim 4, wherein the first and the second electrode sections are arranged in matrix so that each first electrode section and each second electrode section are adjacent to each other.

6. The liquid crystal display according to claim 4, wherein the first and the second electrode sections are arranged in matrix so that a group of a specific number of the first electrode sections and another group of the specific number of the second electrode sections are adjacent to each other.

7. The liquid crystal display according to claim 4, wherein at least one row of a specific number of the first electrode sections and at least one row of the specific number of the second electrode sections are arranged alternately.

8. The liquid crystal display according to claim 4, wherein a plurality of pairs each having one of the first electrode sections and one of the second electrode sections are arranged in matrix.

9. A projector comprising;
a light source to emit a reading light beam;
a filter to allow a specific light beam component only of the reading light beam to pass therethrough;
a polarization beam splitter to split the light beam component in polarization;
a liquid crystal display to optically modulate the light beam component, thus emitting a reflected light beam; and
a projection lens to project the reflected light beam onto a screen via the polarization beam splitter,
wherein the liquid crystal display includes a liquid crystal layer, a first electrode substrate and a second electrode substrate provided as facing the first substrate so that the liquid crystal layer is sandwiched by the first and the second substrates, at least either the first or the second substrate being a transparent substrate, at least either the first or the second substrate being provided with first electrode sections each having a first height and a plurality of second electrode sections each having a second height, the first height being higher than the second height by a predetermined height, areas of the first electrode sections in total and areas of the second electrode sections in total being equal to each other on at least either the first or the second substrate.

10. The liquid crystal projector according to claim 9, wherein the predetermined height is determined in a range from $(1/n) \times \lambda/8$ to $(1/n) \times 3\lambda/8$ where "n" is the index of refraction of the liquid crystal layer and $\lambda$ is a wavelength of emission lines generated by the light source.

11. A liquid crystal display comprising:
a liquid crystal layer;
a first electrode substrate; and
a second electrode a second electrode substrate, provided as facing the first substrate so that the liquid crystal layer is sandwiched by the first and the second substrates, at least either the first or the second substrate being a transparent substrate, at least either the first or the second substrate being provided with first electrode sections each having a first height and a plurality of second electrode sections each having a second height, the first height being higher than the second height by a predetermined height, areas of the first electrode sections in total and areas of the second electrode sections in total being equal to each other on at least either the first or the second substrate, an area of each first electrode section and an area of each second electrode section being equal to each other on at least either the first or the second substrate, the first and the second electrode sections being arranged in matrix so that a group of a specific number of the first electrode sections and another group of the specific number of the second electrode sections are adjacent to each other.

* * * * *